Patented Oct. 10, 1939

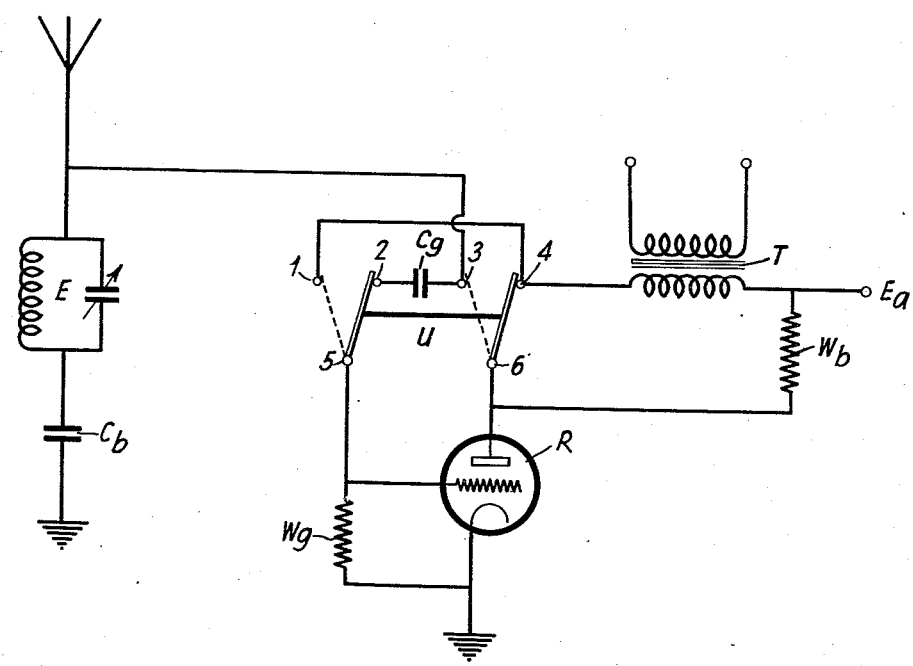

2,175,263

UNITED STATES PATENT OFFICE 2,175,263

DETECTOR

Hans Erich Hollmann, Berlin, Germany, assignor to Telefunken Gesellschaft für Drahtlose Telegraphie m. b. H., Berlin, Germany, a corporation of Germany Application April 17, 1937, Serial No. 137,402
In Germany April 22, 1936

4 Claims. (Cl. 250—27)

It is known that a glow electron tube containing cathode, grid and anode can be utilized principally in two different ways for reception and rectification of electrical oscillations, namely on the one hand, with positive anode, whereby the grid controls the electron current passing to the anode, through action upon the space charge, and on the other hand, in retarding field circuit with positive grid which now plays the part of the anode, while the "anode current" is now controlled through current distribution by the original anode properly termed braking electrode. Both methods have certain advantages and disadvantages. At normal operation the tube can be controlled practically without power consumption, but in this case the detection as regards its frequency course depends on the time constants of the grid circuit. The retarding field audion as regards sensitivity, is not inferior to the ordinary audion, and even superior as regards freedom from distortion and frequency course, but it requires to this end eventually a controlling power which cannot be neglected unless compensated for by special measures applied to the circuit.

In an actual receiver, the one or the other mode of operation may be of advantage according to the requirement. Therefore, it is desirable that in accordance with the invention the tube can be used as desired as ordinary audion and as retarding audion. This requires that the connections to the grid and anode be interchangeable in which case the tube must obviously be equally well suited for both operating modes. In the one case, the supply organ for the modulation frequencies, for instance an audio-frequency transformer, is in the plate circuit, while the grid receives across the grid condenser the potentials to be rectified, and is charged across a high-ohmic leakage resistor in accordance with the modulation rhythm.

In the other case, the output transformer is placed between the plate potential source and the grid, while the braking electrode must have the high-frequency potentials applied, and must have a certain bias potential. As in the ordinary audion, the proper bias potential can be obtained as is known in that means are provided whereby the retarding field electrode will likewise be charged across a high-ohmic leakage resistor which is to be bridged by a condenser.

The various operating conditions led in both cases to certain requirements as regards the dimensions of the individual circuit elements, and which figure in accordance with the invention in the switching of the tube to one or the other operating mode. In fact, while in the ordinary audion the grid condenser must be so small that it can be charged and discharged in the rhythm of the modulation through the direct potentials appearing at the grid, the condenser bridging the leakage resistor of the retarding field audion must be so large that no appreciable modulation potentials appear, but only modulation currents absorbed at the grid side in accordance with the control of the distribution.

In the figure a circuit arrangement is represented by which as may be desired, the tube R can be switched by means of the double pole switch U to ordinary audion and retarding field audion, whereby the requirements of the various operating modes are complied with in the simplest manner. There will first be considered the position U shown in full lines which appertains to the ordinary audion (switch contacts 5 and 6 placed at contacts 2 and 4): The output transformer T receives on the one hand the plate potential $E_a$, and is connected on the other hand, to the anode of the tube R. The high-frequency potentials from the receiving circuit E pass across the open contact 3, the grid condenser $C_g$ and across the contacts 2 and 5 to the grid from which leakage takes place to the cathode across resistor $W_g$. There is inserted between E and ground the very large capacitance $C_b$ which represents a short circuit as regards high-frequency, while being of no importance as compared with the small series condenser $C_g$. Parallel to T the extremely high-ohmic resistor $W_b$ is placed whose shunt can be neglected in view of its high value.

$C_g$=200 cm.
$W_g$=1.0 MΩ
$C_b$=4µ F.
$W_b$=5.0 MΩ

If the switch U is moved into the position shown in dash lines (5 and 6 in contact with 1 and 3) the following circuit exists: The transformer T now lies at the grid across 1 and 5, and the input circuit lies at the braking electrode across 3 and 6. The grid condenser $C_g$ of the normal audion is disconnected and the retarding field circuit contains only the large capacity $C_b$ which short circuits for the modulation frequencies the leakage resistor $W_b$ between the retarding field electrode and the plate potential source. The potential of the braking electrode moves across $W_b$ to the intersection point of the resistance line with the retarding current characteristic i. e. to the value found to be the most favorable value. Now the transformer T will be slightly damped by the series resistor $W_g$ placed in parallel to the inner grid resistance of the tube, and which in view of the high value of $W_g$ has practically likewise no appresiable effect. If the damping is not desired in the one as well as in the other case, then when not in use the two leakage resistors $W_g$ and $W_b$ are to be disconnected across further contacts connected with U.

The circuit permits of numerous other combinations, but which do not entail new features as compared with the described example. Principally the scheme is the same if instead of a triode a multielectrode tube is employed, or if for reducing the damping the anode circuit is inductively return coupled upon the input circuit, it being only necessary that in this case the polarity of the feed-back coil be reversed at switching.

I claim:

1. In radio receiving apparatus an electronic tube having a cathode, a plate and a grid electrode, a signal responsive circuit, an output device, a pair of impedance elements, a switching device arranged when in one position to form an audion detector circuit characterized by the production of rectified grid current resulting from signal input to the grid, and in another position to form a retarding field detector circuit characterized by the production of rectified plate current resulting from signal input to the plate, one of said impedance elements being required to be operatively connected in the audion detector circuit and the other thereof being required to be operatively connected in the retarding field circuit, said second named required impedance element being fixedly conected between the anode of said tube and a point of constant potential, said switching means being arranged to provide a connection for the flow of rectified grid current through said first required impedance when in the first named position and a connection for the flow of rectified plate current through the second required impedance when in its other position.

2. In radio receiving apparatus, a detector circuit including an electronic tube having an anode, a cathode and a grid electrode, a switching device provided with a plurality of contact points, an output transformer winding having one end connected to a source of positive potential and the other end connected to both a first contact point and a second contact point of said switching device, a pair of terminals adapted to be connected to a source of high frequency signalling energy, a connection between one of said terminals and a third contact point of said switching device, a condenser of comparatively high capacity connected between the other of said terminals and the cathode of the tube, a small capacity condenser connected between the third contact point and a fourth contact point of the switching device, means for connecting a high resistance element, means for connecting the high resistance element between the anode of the tube and the end of said output transformer winding which is connected to the source of positive potential, a grid leak resistance, means for connecting said grid leak resistance between the grid and cathode of said tube, said switching device including a pair of operable poles one thereof being connected to the anode of said tube and the other to the grid thereof, said poles cooperating with said four contact points for connecting the anode to the second contact point and the grid to the fourth contact point when in one position and the anode to said third contact point and the grid to the first contact point when in another position.

3. In radio receiving apparatus, a detector circuit including an electronic tube having an anode, a cathode and a grid electrode, a switching device having first, second, third and fourth contact elements and two poles, means connecting the first and fourth contact elements together, one of said poles being adapted to be operated between the first and second contacts and the other pole being adapted to be operated between the third and fourth contacts, an input circuit for said tube comprising a signal resonant circuit and a comparatively high capacity condenser in series connected between the third contact element and the cathode of said tube, a comparatively small capacity condenser connected between the second and third contact elements of said switching device, means for connecting the first mentioned pole of the switching device to the grid electrode of said tube, means for connecting the other pole of said switching device to the anode of said tube, an output circuit for said tube including an output transformer winding and a source of uni-directional potential in series connected between the fourth contact element and the cathode of said tube, said source of uni-directional potential being connected in said last named circuit so that the positive side thereof is connected to said fourth contact element, a grid leak resistance, means for connecting said grid leak resistance between the grid electrode and the cathode of said tube, a comparatively high value resistance element and means for connecting said last named resistance element between the anode of the tube and the positive terminal of said source.

4. In radio receiving apparatus, a detector circuit including an electronic tube having an anode, a cathode and a grid electrode, a double pole switch having first, second, third and fourth contact elements, means for connecting one of the poles of said switch to the grid electrode of said tube, said last named pole being adapted to be operated between said first and second contact elements, means for connecting the other pole of said switch to the anode of said tube, said last named pole being adapted to be operated between the third and fourth contact elements, an input circuit for said tube including a signal resonant circuit and a condenser of the order of $4\mu F$ connected in series between the third contact element and the cathode of the tube, an output circuit for said tube including an output load device and a source of uni-directional potential connected between the fourth contact element and the cathode of said tube, means for connecting said fourth contact to the first contact element, a condenser of the order of 200 cm. connected between the second and third contact elements, a resistance element of the order of one megohm connected between the grid and cathode of said tube and a resistance element of the order of 5 megohms connected between the anode of said tube and a point of the output circuit.

HANS ERICH HOLLMANN.